United States Patent [19]

Young et al.

[11] Patent Number: 5,742,222
[45] Date of Patent: Apr. 21, 1998

[54] DIRECT ADHERING POLYSILICON BASED STRAIN GAGE

[75] Inventors: Thomas M. Young, Oakland; Pierre R. Irissou, Sunnyvale, both of Calif.

[73] Assignee: AVI Systems, Inc., Oakland, Calif.

[21] Appl. No.: 451,670

[22] Filed: May 26, 1995

[51] Int. Cl.$^6$ ............................................ G01L 1/22
[52] U.S. Cl. ...................... 338/2; 338/4; 29/610 SG; 73/706; 73/721
[58] Field of Search ................................ 338/2, 3, 5, 6, 338/4, 42; 73/776, 862.627, 706, 721, 727; 341/22, 34; 29/610 SG, 454

[56] References Cited

U.S. PATENT DOCUMENTS

| | | |
|---|---|---|
| 4,291,293 | 9/1981 | Yamada et al. . |
| 4,766,666 | 8/1988 | Sugiyama et al. ............... 29/610 SG |
| 4,773,269 | 9/1988 | Knecht et al. ............... 73/706 |
| 4,945,773 | 8/1990 | Sickafus . |
| 5,090,254 | 2/1992 | Guckel et al. . |
| 5,188,983 | 2/1993 | Guckel et al. . |
| 5,192,938 | 3/1993 | Ort . |
| 5,241,308 | 8/1993 | Young . |
| 5,275,055 | 1/1994 | Zook et al. . |

OTHER PUBLICATIONS

E.Obermeier et al; Characteristic of Polysilicon Layers and Their Application in Sensors; Rec. of the IEEE Solid State WKSHP. 1986.
Kulite Semiconductor Strain Gage Manual.
Catalog 500; Part B Strain Gage Tech Data; Micro-Measurement Division.

*Primary Examiner*—Tu B. Hoang
*Attorney, Agent, or Firm*—Steinberg Raskin & Davidson P.C.

[57] ABSTRACT

An economical non-metallic strain gage insensitive to ambient temperature variations, and without a diode junction, which is suitable for general use and particularly for use in touch screens, wherein the gage is adapted to be directly adhered to the screen. The gage is metallized with a thin layer of a solderable metal for electrical soldering connection to strain measurement devices and for reliable mechanical support. The gage includes an etched polysilicon material on a substrate base, such as a silicon wafer, wherein the polysilicon is doped with a dopant material such that output measurements are independent of temperature changes.

21 Claims, 3 Drawing Sheets

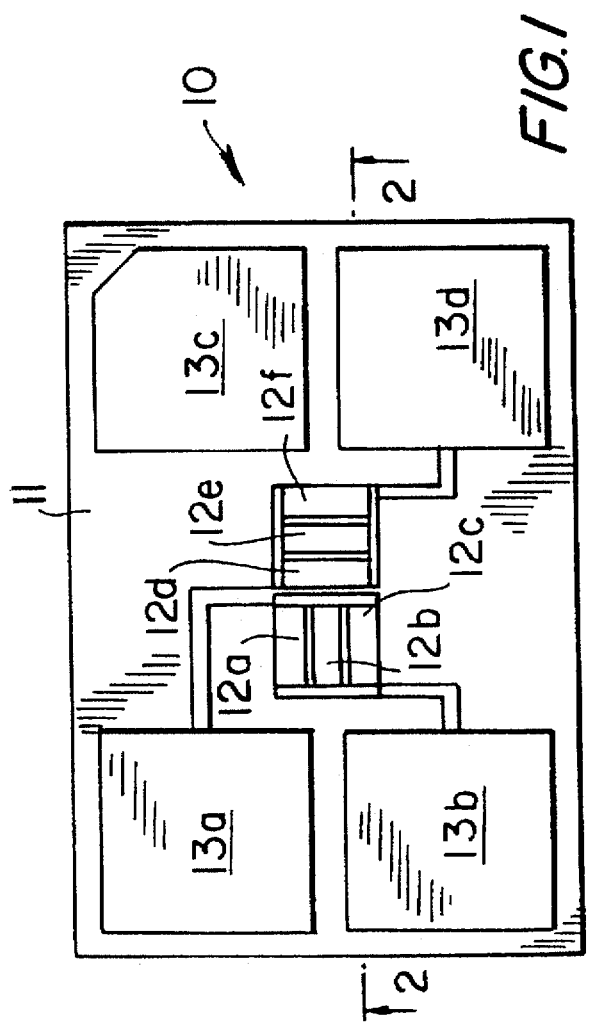
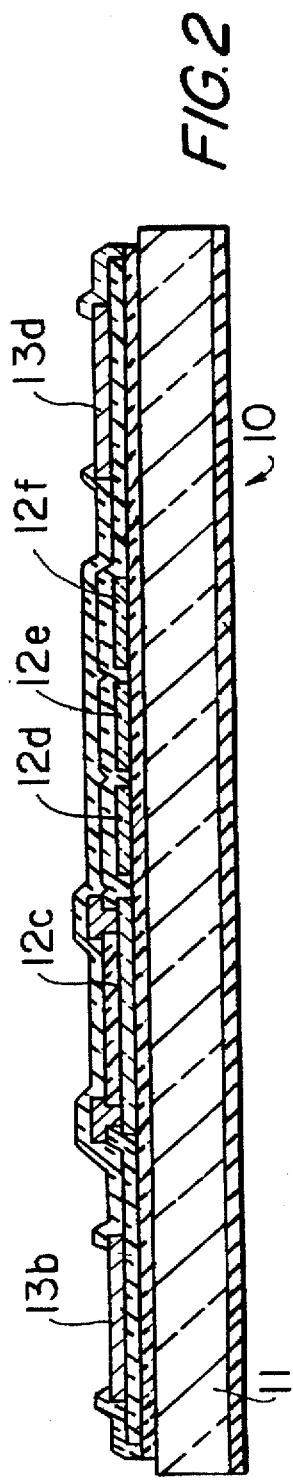

DIRECT ADHERING POLYSILICON BASED STRAIN GAGE

FIELD OF THE INVENTION

This invention relates to general purpose strain gages and such gages as used in touch screens and particularly to non-metallic semiconductor strain gages.

BACKGROUND OF THE INVENTION

Strain gages, are devices which measure the strain placed on substrates or connected materials to provide measurably useful information, and which can be translated into physical actions, e.g., for use in operation of touch screens. As described, for example, in U.S. Pat. No. 5,241,308, strain gages are used in applications such as in conjunction with an AVI® touch panel, in providing force sensing means with emitted strain measurement signals. These emitted signals are unique for different positions being touched on the panel, and with the position on the panel being touched being related to a desired command or action.

Two general types of strain gages are extant, for use in applications such as touch screens or panels. Each has inherent drawbacks. A first and most common type of strain gage is the metallic foil gage, which is effectively a wire having an electrical resistance which increases when it is stretched. The typical commercial foil gage comprises a thin nickel foil adhesively bonded to a thin Kapton substrate and etched into a zigzag grid pattern. Solder pads thereon provide for external electrical attachment. Mechanical attachment to the systems being measured (for operative strain measurements), is effected by adhesives, generally of the organic type.

As a result of adhesion with these adhesive materials, measurement errors resulting from creep (inelastic flow) of the adhesive bond, are prevalent. The creep causes a change in the highly sensitive measurement balance between the sensor and the substrate being subject to strain. Detrimental creep occurs, usually under conditions of temperature fluctuation, and is a particular source of problems with strain gages utilized in non-controlled environmental conditions, e.g. outdoors, or in applications subject to inherent temperature increases (e.g., a touch screen adjacent monitor elements which tend to heat up during use). In addition, small signal outputs from metal foil gages result in inherently further lowering accuracies of measurement.

A second type of strain gage is a semiconductor type comprised of single crystal silicon substrates, which operates by change of the resistive properties caused by diffusion of impurities into the single crystal. The primary advantage of this type of strain gage over that of the metal foil strain gage, is its relatively much higher signal output. However, there are significant disadvantages with semiconductor strain gages as well. These gages are small, fragile and difficult to handle, particularly since they require electrical connection with wire bonding and very small wires. Furthermore their sensitivity to temperature variations is very high and they are also optically sensitive. These gages also suffer from the same adhesive mounting creep problems prevalent with the metal foil strain gages.

It is accordingly an object of the present invention to provide a non-metallic semiconductor strain gage, adapted to be adhered to the item being measured, but which strain gage is relatively insensitive to temperature changes within its operative range and is mountable with a non-creep susceptible connection.

It is a further object of the present invention to provide such strain gage with greater reliability and a more accurate measurement output.

It is yet another object of the present invention to provide the strain gage without susceptibility to diode junction effect.

These and other objects, features and advantages will become more evident from the following discussion and drawings in which:

SHORT DESCRIPTION OF THE DRAWINGS

FIG. 1 is top view of the strain gage of the present invention;

FIG. 2 is a cross section view of the strain gage of FIG. 1, taken along line 2—2;

SUMMARY OF THE INVENTION

Figure 3:
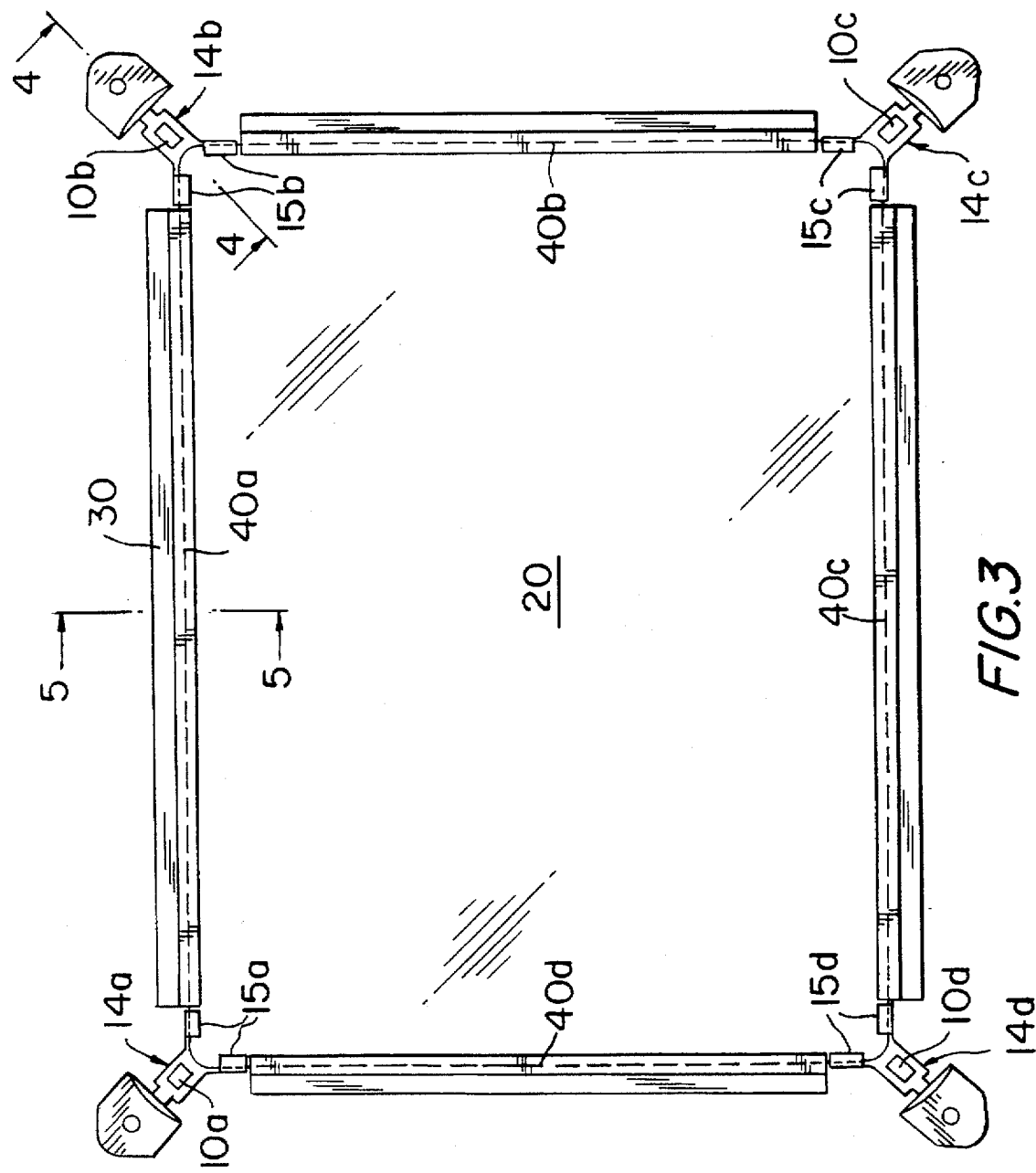
FIG. 3 depicts four strain gages of FIGS. 1 and 2, as mounted on a touch screen.

Generally the present invention comprises general purpose semiconductor strain gages and particularly such strain gages suitable for use with touch screens and touch screens having such gages operably integrated therewith. In accordance with the present invention, the strain gage comprises a half bridge strain gage pattern etched from a thin polysilicon layer deposited on one surface of an inert substrate such as a silicon chip. A portion of the substrate adjacent the polysilicon layer and/or the other side of the silicon chip is metallized with a thin layer of a metal, or combination of metals, suitable for high adherency to the silicon chip (or other substrate being utilized), and whereby it provides a relatively large surface for soft solder attachment of the strain gage to the system being measured.

The metallization (composition and thickness), with adherence to the substrate such as the silicon chip, must be able to accurately transmit strains to the sensor elements of the silicon and polysilicon layer(s) without bonding failure. The solder connection replaces the bonding with organic adhesives in the prior art, whereby reliability and repeatability of strain measurements is enhanced over what is obtained with foil and silicon based gages. The solder material is preferably matched to the metallic or other substrates to which it is adhered, in order to prevent bonding separation caused by expansions and contractions with temperature fluctuations. To this effect, a gold-tin (Au—Sn) based solder has been found to provide a more stable mechanical connection than the commonly utilized lead-tin (Pb—Sn) solder material, when mounted on steel, the most common solderable metal substrate material.

Suitable metallization materials include metal combinations, such as Ti—Ni—Au and Ti—Pt, wherein titanium (Ti) provides a reactive adherent bond to the silicon and an adherent interface to a next metal layer such as nickel (Ni) or platinum (Pt) which provide an insoluble but solderable surface. Gold (Au) is used with an exposed nickel surface in order to prevent oxidation thereof. Solder attachments may be direct, or with the chip positioned face down (with areas adjacent to the polysilicon being metallized such as on a printed circuit board or flex circuit to measure strains in the board. This type of soldered connection can also provide a secure mechanical attachment to a ceramic or other type of circuit board and is suitable for automation in an assembly process.

In prior art semiconductor silicon gages, which operate by means of a resistor formed by diffusing a channel into bulk silicon, a diode junction is formed at the boundary between the channel and the body. This junction, if large, can store significant charge and the energy can blow a hole through the junction wall. If the junction is exposed to light or other emi energy, current will flow across it. If exposed to varying voltage, the effective width of the channel will vary. By providing the etched thin film polysilicon of the present invention wherein the silicon is only a substrate material (and not the resistive element), there is no such diode junction with its deleterious effects.

DETAILED DESCRIPTION OF THE INVENTION

In etching the polysilicon to provide the strain gage resistive element, three bridge contacts are provided, and since there are no diode junctions, no other electrical contacts are needed. The metallization of the silicon at a position removed from the polysilicon is isolated from the resistor pattern and serves only for mechanical attachment. Characterization of the strain gage of the present invention as being non-metallic is with respect to the operational function of the strain gage and not the means for its mechanical attachment, as heretofore described.

As an additional advantage of the etched polysilicon operational structure, there is little or no crystallographic orientation sensitivity in the strain gage formed therewith. Thus, in diffused silicon resistors of the prior art, a linear object subjected to transverse strain will change resistance in an equal but opposite way from when the strain is longitudinal but there is no way to isolate negative transverse effect from positive longitudinal effect in such prior art sensors.

By utilizing an etching process, in accordance with standard semiconductor etching procedures, the two elements in the half bridge in the polysilicon layer, have a matching resistance which is very high, with a degree of magnitude less than 1% difference between them. This high degree of matching permits a further significant reduction in temperature sensitivity of the gage.

An additional factor leading to inaccuracies with prior art strain gages relates to the fact that strain gages are utilized by direct adherence to the system being measured, e.g., directly bonded to touch screens, whereby they are not thermally shielded from temperature variations. Thus, prior art semiconductor strain gages have been plagued with high sensitivity and inaccuracies when subjected to temperature variations.

In accordance with the present invention, the polysilicon is doped with a dopant material such as boron with high dopant levels in order to minimize such thermal effects. The dopant level can be further adjusted to reduce any apparent strain from mounting on materials with dissimilar thermal expansion coefficients, such as steel. Though similar types of doping polysilicon in strain gages, for temperature stability, has been previously effected, such as described in CHARACTERISTICS OF POLYSILICON LAYERS AND THEIR APPLICATION IN SENSORS by E. Obermeier et al. in Rec. of the IEEE Solid State Sensors Workshop, 1986 (pp 83–86), these strain gages have been in the form of piezoresistors and not in the form of directly adhering strain gages as in the present invention. Temperature sensitivity and stability is however different and not readily predictable in the different application forms. Thus, as shown by Obermeier, temperature independent operation of the polysilicon resistor is maximized at a doping level of about $4.5 \times 10^{15}$ cm$^3$ (4.5E15). However, effective resistance and temperature stability levels (and normalized resistor values with the adherable strain gages of the present invention, occur at much lower doping levels of about 2E15). This is contrary to Obermeier's teachings, which stress that increased doping levels are required for temperature stability.

As described, a factor for accurate measurement, related to temperature changes, is the degree of expansion of the substrate, such as a metal substrate of stainless steel, upon increased temperature, relative to that of the silicon sensor. Since metal substrates of this type have greater temperature coefficients than the silicon based sensor, there is a dishing effect at the interface between sensor and substrate. The extent of this dishing effect is a further function of the thickness of the metal substrate. Thus, thin substrates (equal to or less than the thickness of the sensor) have more pronounced dishing and a negative temperature coefficient. Thicker substrates tend to go toward positive. It is desirable to obtain as close to zero as possible value, for the temperature coefficient, in order to avoid introduction of error factors, and this is preferably effected by adjusting the thickness of the metal substrate appropriately. Alternatively, it is possible to achieve the same or similar effect by making the longitudinal and transverse temperature coefficients equal to each other. This is preferably effected by altering the known physical characteristics of the specific metal used in the substrate (e.g., with changes in thickness, removal of material, etc.) in a manner which provides such equality.

Aside from being substantially insensitive to temperature changes and fluctuations, the strain gages of the present invention, also provide significantly higher reliability because of the elimination of adhesive bonding, as well as the typical gage factor greater than ten times that of presently used commercial foil gages. In addition, the single crystal silicon chip substrate for the polysilicon strain gage, provides a good low creep mechanical foundation for a strain gage with its own self supporting structural element. With a congruent or similar configuration, the strain gages of the present invention allow for direct replacement for foil gages, which is not always possible with typical prior art semi-conductor gages. It has been additionally discovered that a geometrically square sensor provides the best possible signal with reference to signal to noise ratio and such configuration is preferred.

Various applications, in addition to touch screens, for which the strain gages of the present invention are useful (including those with inclement conditions normally not suitable for strain gages of the prior art); in the continuous or intermittent measurement of strain, include accelerometers, transducers, aviation structures, weigh scales, force transducers, dams, microphones, alarms, bridges, etc.

DETAILED DESCRIPTION OF THE DRAWINGS AND THE PREFERRED EMBODIMENT

With specific reference to the drawings, strain gage 10, shown in FIGS. 1 and 2 is comprised of silicon wafer substrate 11, having polysilicon layer elements 12a–f deposited thereon. Metallized areas 13a–d are comprised of thin layers of titanium and nickel (with a protective gold coat on the exposed nickel) which provide areas for effecting a solder connection between the system being measured and the strain gage. The solder connection provides both an electrical connection to the resistive polysilicon elements and a reliable mechanical mounting of the strain gage 10 to the system, which mounting is not subject to creep.

Figure 4:
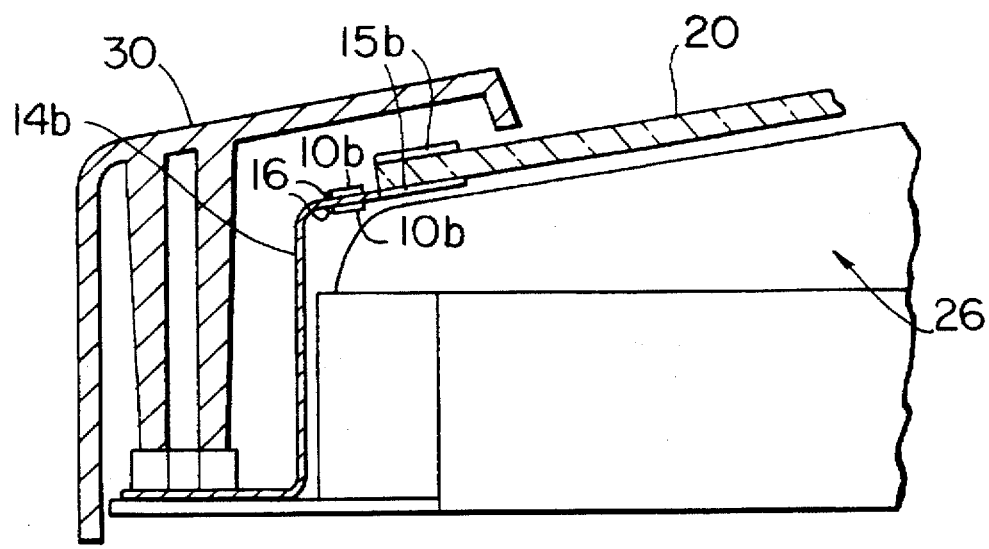
FIG. 4 is a cross section view taken along line 4—4 of FIG. 3.
Figure 5:
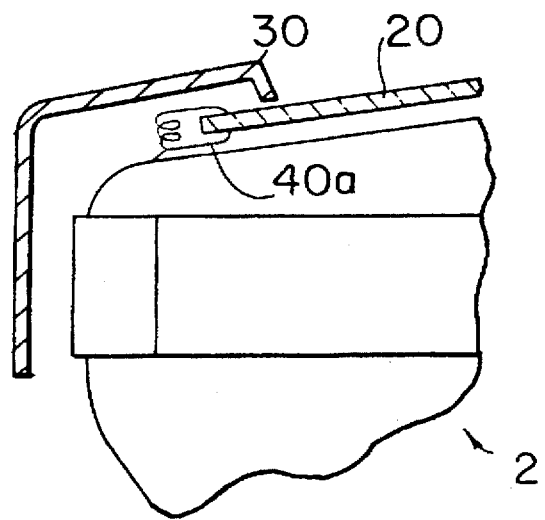
FIG. 5 is a cross section view taken along line 5—5 of FIG. 3.

In a typical strain gage application, four strain gages 10a–d are depicted as being placed on a typical touch screen 20 in FIGS. 3–5. As shown in FIG. 3, glass touch screen panel 20 is closely retained by four corner brackets 14a–d. As shown in FIG. 4, with a cross section view of bracket 14b, the corner of the glass panel 20 is closely retained within metal clip 15b of bracket 14b and epoxy bonded thereto. The strain gage sensor 10b is soldered with solder 16 between metallized areas 13a–d, shown in FIG. 1, and the mounting stand of bracket 14b. As a result the strain gage sensor 10b (with a c-shape configuration) sandwiches a section of the mounting bracket 14b, adjacent the metal clip 15b, with retained glass of touch panel 20. Strain engendered by a touching of the glass panel at a particular position of the surface thereof, causes a measurable deflection of the glass, which is in turn transmitted through the metal of the bracket to gage sensor 10b (similar transmissions occur to the remaining gages 10a, 10c and 10d). The gages are electrically interconnected and connected to external elements for translation of measured strain, via resistance level changes in the polysilicon strain gage, to events or measurements. As shown in FIGS. 3 and 5, wires 40a–d effect such electrical connection and interconnection. Though the strain gages 10a–d are protected from exterior elements by front bezel 30 which peripherally encloses the edges of panel 20, they remain exposed to possible interior heat build-up within the electronics used in conjunction with the touch screen 20 and accordingly the gage sensors are stabilized with doping such as with boron, to maintain temperature stability of measured resistance changes.

It is understood that the above examples and discussion are merely illustrative of the present invention and that changes may be made in structure, components, applications, physical relationships and the like without departing from the scope of the present invention as defined in the following claims.

What is claimed is:

1. A semi-conductor strain gage for directly adhering to and for operably connecting with, a system being measured, said strain gage comprising:

an inert substrate having a first surface portion and a second surface portion, the second surface portion being metallized with a thin layer of metal, the second surface portion providing a surface for soft solder attachment of the strain gage to the system;

a thin polysilicon layer deposited on the first surface portion;

a half bridge strain gage pattern etched from the thin polysilicon layer of the first surface portion of the inert substrate.

2. The strain gage of claim 1, wherein the half bridge in the polysilicon layer includes a first and second elements which have a matching resistance with a degree of magnitude less than 1% difference between them.

3. The strain gage of claim 1, wherein said substrate is comprised of silicon.

4. The strain gage of claim 3, wherein said polysilicon layer is doped with sufficient dopant material to maintain a substantially constant resistance level over a temperature range which the gage is subject to, by adherence to said system.

5. The strain gage of claim 4, wherein said dopant material is boron.

6. The strain gage of claim 5 wherein said boron is present in an amount of about $2 \times 10^{15}$ cm$^3$.

7. The strain gage of claim 1, wherein said metal is selected from the group consisting of titanium, nickel, gold, and platinum.

8. The strain gage of claim 1 wherein a solder material for securing the strain gauge to the system is matched to a material on the system to which the strain gage is adhered, whereby bonding separation caused by expansions and contractions with temperature fluctuations is prevented thereby.

9. The strain gage of claim 8, wherein the material is comprised of steel.

10. The strain gage of claim 9, wherein said solder material is comprised of a gold-tin alloy.

11. The strain gage of claim 3, wherein said gage has a square configuration.

12. A touch screen having at least four electrically interconnected strain gages of claim 1, adherently connected thereto.

13. The strain gage according to claim 1, wherein the thin layer of metal comprises at least two metals.

14. The strain gage according to claim 1, wherein the second surface portion is on an obverse side of the substrate from the first surface portion.

15. The strain gage according to claim 1, wherein the second surface portion is adjacent to the first surface portion.

16. The strain gage of claim 1, wherein said metal is a metal combination selected from two or more elements from the group consisting of titanium, nickel, gold, and platinum.

17. The semi-conductor strain gage of claim 1, wherein the surface for soft solder attachment is relatively large.

18. A semi-conductor strain gage and system to be measured, comprising:

a system to be measured having a metal substrate;

a semi-conductor strain gage directly adhered to the system being measured, said strain gage being positioned on the metal substrate of the system to be measured, the strain gage including:

an inert substrate having a first surface portion and a second surface portion, the second surface portion being metallized with a thin layer of metal, the second surface portion being soft soldered to the metal substrate of the system to be measured;

a thin polysilicon layer deposited on the first surface portion; and a half bridge strain gage pattern etched from the thin polysilicon layer of the first surface portion of the inert substrate.

19. The strain gage and system of claim 18 further comprising means for minimizing a difference between a temperature coefficient of the strain gage and a temperature coefficient of the substrate.

20. The strain gage and system of claim 18, wherein the metal substrate has a first thickness and the strain gage has a second thickness, the first and second thicknesses being selected to minimize a difference between a temperature coefficient of the strain gage and a temperature coefficient of the substrate.

21. The strain gage and system of claim 18, further comprising means for making the longitudinal and transverse temperature coefficients of the metal substrate equal to each other.

* * * * *